United States Patent [19]

Bovenkerk et al.

[11] 4,311,490

[45] Jan. 19, 1982

[54] DIAMOND AND CUBIC BORON NITRIDE ABRASIVE COMPACTS USING SIZE SELECTIVE ABRASIVE PARTICLE LAYERS

[75] Inventors: Harold P. Bovenkerk; Gordon M. Kibler, both of Worthington, Ohio

[73] Assignee: General Electric Company, Worthington, Ohio

[21] Appl. No.: 219,289

[22] Filed: Dec. 22, 1980

[51] Int. Cl.$^3$ ............................................. C09C 1/68
[52] U.S. Cl. ...................................... 51/307; 51/293; 51/309; 72/146; 76/107 A
[58] Field of Search ................... 51/307, 309, 293; 72/146; 76/107 A

[56] References Cited

U.S. PATENT DOCUMENTS

| | | | |
|---|---|---|---|
| 3,609,818 | 1/1970 | Wentrof | 18/34 R |
| 3,743,489 | 7/1971 | Wentrof et al. | 51/307 |
| 3,745,623 | 7/1973 | Wentrof et al. | 29/95 B |
| 3,767,371 | 10/1973 | Wentrof et al. | 51/307 |
| 3,831,428 | 8/1974 | Wentrof et al. | 72/467 |
| 3,850,591 | 11/1974 | Wentrof | 51/307 |
| 4,219,339 | 8/1980 | Wilson | 51/307 |
| 4,231,762 | 11/1980 | Hara et al. | 51/307 |
| 4,259,090 | 3/1981 | Bovenkerk | 51/307 |

FOREIGN PATENT DOCUMENTS

1382080 1/1975 United Kingdom .

OTHER PUBLICATIONS

Wentrof, R., et al., "Sintered Super Hard Materials", *Science,* vol. 208, pp. 873-880, May 23, 1980.

*Primary Examiner*—Donald E. Czaja
*Assistant Examiner*—W. Thompson
*Attorney, Agent, or Firm*—Douglas B. Little; Jerry K. Mueller, Jr.

[57] ABSTRACT

Disclosed is an improved process for preparing a composite compact wherein a mass of abrasive crystals, a mass of metal carbide, and a bonding medium are subjected to a high-temperature/high pressure process for providing a composite compact. The sintered carbide mass supports the mass of abrasive crystals and bonding or catalyst metal, and the abrasive crystal grains are directly bonded to adjacent crystal grains in the mass thereof. Such improved process comprises disposing the mass of abrasive crystals in layers wherein the coarsest layer is closest to the carbide mass and is composed of crystals having a largest dimension of between about 75 and 500 microns and the finest layer is disposed farthest away in the carbide mass and is composed of crystals having a largest dimension of less than 10 microns. The abrasive crystals are selected from the group consisting of diamond and cubic boron nitride and preferably are diamond; the metal carbide preferably is tungsten carbide; and the bonding metal preferably is cobalt. The resulting improved composite compact also is disclosed.

24 Claims, No Drawings

DIAMOND AND CUBIC BORON NITRIDE ABRASIVE COMPACTS USING SIZE SELECTIVE ABRASIVE PARTICLE LAYERS

BACKGROUND OF THE INVENTION

The present invention relates to diamond and CBN (cubic boron nitride) compacts useful in manufacturing cutting tools and dies, and more particularly to improved diamond and CBN compacts of greater thickness and better integrity.

Diamond and CBN compacts for manufacturing cutting tools or wire drawing dies can be made by several techniques. One technique (British Pat. No. 1,382,080) places a mass of a metallic binder material in a high pressure apparatus upon which is placed a mass of particulate diamond. The masses are subjected to a pressure of greater than 10 Kbars at a temperature sufficient to melt the binder material for a time period of from 30 seconds to 3 minutes. The resulting diamond-metal compact is a composite of diamond crystals and a metallic binder which is dispersed mainly in the interstices between individual diamond crystals to bind such crystals together.

Another proposal for manufacturing such compacts (U.S. Pat. Nos. 3,745,623; 3,609,818; and 3,850,591) involves the sweep through catalyzed recrystallization method (STCR method). The STCR method disposes polycrystalline diamond or CBN preferably on carbide powder or a cemented carbide substrate disposed within a high pressure/high temperature apparatus. Alternately, the starting catalyst can be a single or multiple body or disc or annular shape in contact with the diamond or CBN powder. A small quantity of a bonding or catalyst metal selected from cobalt, nickel, and iron or aluminum alloy in the case of CBN is disposed in admixture with the abrasive crystals or with the carbide mass, or can be provided from the cemented carbide substrate. High temperature and high pressure in the diamond or CBN stable region then is applied for a time period generally exceeding 3 minutes. The resulting compact is characterized particularly by diamond-to-diamond or CBN-to-CBN bonding through the catalyzed recrystallization of the abrasive crystals being subjected to the process.

Methods for making cubic boron nitride compacts are disclosed in U.S. Pat. Nos. 3,743,489; 3,767,371; and 4,231,980.

For optimized strength of the compact product, very fine crystals of the abrasive typically are used, generally in particle size of less than 10 microns and preferably less than 5 microns. Such fine abrasive crystals crush extensively under the high pressures applied during the compaction process resulting in an initial packing density of around 1.5 grams/cc increasing to greater than 2.5 grams/cc by crystal fracturing. The resulting abrasive mass, therefore, is rather dense and offers resistance to the catalyst metal or catalyst metal and carbide from percolating or sweeping through the interstices therein. In practice, this sweep recalcitrance by the dense, fractured abrasive crystals leads to soft spots of non-bonded abrasive. These soft spots are especially prevalent when the layer of abrasive crystals exceeds about 1 mm in thickness. Coarser abrasive crystals offer channels in the compacted mass which are less torturous for the bonding metal to sweep through; however, surface finish and strength considerations usually preclude the use of such coarse crystals as starting materials for the compact. Addition of catalyst powder in making the compacts does not overcome the problem of soft spots or low final density.

BROAD STATEMENT OF THE INVENTION

The invention solves the problems encountered in the art in making diamond and CBN composite compacts by improving the process which comprises:

A. placing within a protective shield metal enclosure which is disposed within the reaction cell of a high pressure/high temperature (HP/HT) apparatus:
  (1) a mass of abrasive crystals selected from the group consisting of diamond and cubic boron nitride; and
  (2) a quantity of metal carbide selected from the group consisting of tungsten carbide, titanium carbide, tantalum carbide, and mixtures thereof which contains a metal bonding material or catalyst selected from the group consisting of cobalt, nickel, iron, or aluminum alloys for CBN and mixtures and/or alloys thereof;

B. subjecting the contents of the shield metal enclosure to the following conditions:
  (1) for diamond
    (a) a pressure of at least 50 Kbar at a temperature of at least 1300° C. and within the diamond stable region; and
    (b) a reaction time of between 3 and 120 minutes;
  (2) for cubic boron nitride:
    (a) a pressure of at least 42 Kbars at a temperature of at least 1300° C. and within the cubic boron nitride stable region; and
    (b) a reaction time of between about 2 and 120 minutes; and C. recovering the composite compact produced.

The diamond stable region is the range of pressure temperature conditions under which diamond is thermodynamically stable. On a pressure-temperature phase diagram, it is the high pressure side, above the equilibrium line between diamond and graphite. The cubic boron nitride stable region is the range of pressure temperature conditions under which cubic boron nitride is thermodynamically stable. On a pressure-temperature phase diagram, it is the high pressure side, above the equilibrium line between cubic boron nitride and hexagonal boron nitride.

Such improved process comprises disposing the mass of abrasive crystals in step A. in at least two layers. The first layer which is closest to the carbide mass or catalyst source is comprised of coarser abrasive crystals having a largest dimension of between about 75 and about 500 microns. The second layer which is disposed adjacent said first layer and farthest away from the carbide mass is comprised of finer abrasive crystals having a largest dimension of less than 10 microns. For wire die compacts, the abrasive crystals are arranged concentrically inside an annular carbide mass instead of being arranged in layers, the coarser crystals (75–500 microns in largest dimension) being in a ring adjacent to the carbide mass and the finer crystals (less than 10 microns in largest dimension) comprising a circular core. In layers or in annular structure, more than one layer or ring of crystals may be used. For the layered structure, the size of the crystals decreases with each successive layer outwardly from the carbide mass. For wire die compacts, each smaller diameter ring is comprised of smaller sized crystals progressively from the outer annular carbide mass to the circular core of smallest crystals. Although the description of the invention which follows is directed particularly to tool blank-type compacts having layers of diamond or CBN, such description equally is applicable to wire die compacts by simply exchanging the layers for concentric rings and a core as described above.

The resulting composite compact is an improved composite compact of the type comprising a sintered carbide mass which supports or surrounds a mass or layer of polycrystalline abrasive crystal grains selected from diamond and cubic boron nitride (CBN) and a bonding metal selected from cobalt, iron, nickel, or aluminum alloys for CBN, mixtures and/or alloys thereof. There is intercrystal bonding between adjacent grains which comprises common portions of crystal lattices shared between adjacent crystals and resulting from recrystallization at HP/HT conditions.

The diamond or CBN layer in the improved compact comprises diamond or CBN grains in random orientation but having at least two layers, one layer of coarser grains adjacent to said carbide mass and another layer of finer grains adjacent said coarser layer. The layer or ring of coarser grains is derived from crystals having a largest dimension of between about 75 and 500 microns and said layer of finer crystals is derived from crystals having a largest dimension of less than 10 microns. The layers of said crystals are bonded to each other and said coarser layer is bonded to the carbide mass by a high temperature/high pressure operation conducted within the diamond stable region for diamond abrasive crystals and within the cubic boron nitride stable region for cubic boron nitride abrasive crystals, adequate for said bonding to be achieved.

Advantages of the use of size selective abrasive particle layers for forming composite compacts include the ability to achieve a compact which possesses a better bond of the mass of abrasive crystals to the substrate and a polycrystalline mass which possesses improved integrity. Further, soft spots of non-bonded abrasive in the abrasive mass are substantially suppressed, hence greater uniformity. Moreover, the thickness of the mass of abrasive crystals can be increased over the thickness that the prior art possesses to exceed about 1 mm and can be as high as about 4 mm or more. Still further, the sweep through of the bonding metal is improved by use of the size selective layers of abrasive particles. These and other advantages will become readily apparent to those skilled in the art based upon the disclosure contained herein.

DETAILED DESCRIPTION OF THE INVENTION

The process of manufacturing the improved composite compacts of the present invention and the apparatus useful in such process are conventional in construction and operation. In particular, reference should be made to U.S. Pat. Nos. 3,609,818, 3,745,623; 3,831,428; 3,743,489; and 3,767,371, cited above, as disclosing generally the manufacturing process and apparatus determined to be highly suitable for use in making the improved composite compacts of the present invention. These patents teach that the metal carbide, which forms the sintered carbide mass which supports the mass of abrasive crystals, comprises carbide molding powder selected from the group consisting of tungsten carbide, titanium carbide, tantalum carbide and mixtures thereof. The carbide powder is in admixture with a bonding metal selected from the group consisting of cobalt, nickel, iron and mixtures thereof. The bonding metal makes itself available to function both with the metal carbide and with the mass of abrasive crystals. The bonding metal, thus, functions as a metal bond for sintering the carbide for making the sintered carbide support.

The metal carbide may be sinterable or pre-sintered and is commercially available in grit sizes normally ranging from about 1 to 5 microns. Tungsten carbide molding powder is the preferred metal carbide for use with cobalt being the preferred bonding metal therefor. The composition of the metal carbide mass advantageously consists of mixtures containing about 80–97% carbide and about 3–20% cobalt by weight.

Alternatively, a mass or disc of catalyst (without the metal carbide support) can be used to make an improved compact of diamond or CBN as described herein.

For CBN compacts, an aluminum alloy catalyst (e.g., aluminum/nickel) enhances the degree of bonding of the CBN crystals as taught in U.S. Pat. Nos. 3,743,489 and 3,767,371. Such aluminum metal catalyst (with alloying metal of nickel, cobalt, magnanese, iron, vanadium and chromium) may be in pre-alloyed form or with the alloying metals as separate discs can be alloyed in situ. Preferably, nickel aluminide is admixed with the CBN crystals for making the compact. The proportion of aluminum can range from about 1–40% by weight of the CBN while the alloying metal can range from about 2–100% by weight of the CBN. Further, at about 1600° C. and higher, CBN-to-CBN bonding can be achieved preferably using the sweep through process described above to join the CBN mass to the carbide mass, if a carbide mass is present, without any aluminum catalyst being present.

As to the mass of abrasive crystals, at least 2 layers of graded size are used therefor. The coarser sized abrasive crystals are closest to and adjacent the metal carbide mass and should have crystals having a largest dimension of between 75 and 500 microns. Such coarser sized abrasive crystals provide a less torturous path for the bonding metal to sweep through and provide a highly effective bond to the metal carbide mass. For achieving superior strength and surface finish of the composite compact, a layer of finer-sized abrasive particles are disposed farthest away from the carbide mass and adjacent the coarser layer of abrasive particles. These finer crystals have a largest dimension of less than 10 microns. Of course, grading of the crystal sizes of the abrasive particles can be in more than two layers as is necessary, desirable, or convenient.

The mass of abrasive crystals can optionally be admixed with minor proportions of the bonding metal and/or carbide powder as the afore-cited patents disclose. Here too, bonding of the mass of abrasive crystals to the metal carbide is achieved as well as is the catalytic-solvent effect displayed by the bonding metal.

Of importance in manufacturing the improved composite compacts of the present invention is to achieve the direct bonding of abrasive crystals to adjacent crystals in a self-bonded relationship. Such bonding relationship is essential for achieving compacts highly suitable for use in cutting tools and dies. The mass of abrasive crystals, thus, desirably will contain an abrasive crystal content of at least about 70% by volume and preferably in the range of from 90–99+% by volume.

In order to facilitate assembly of the layers of size-graded abrasive crystals, it can be helpful to encapsulate such layers in a thin foil of cobalt, zirconium, or a like material; or temporarily bond the abrasive particles by a heat-distillable, fugitive binder such as, for example, polymethylmethacrylate, polyvinyl alcohol, paraffin, polyethylene oxide or a similar distillable fugitive binder. After assembly of the composite compact, such binder can be distilled from the compact under vacuum in an oven in conventional fashion.

Consolidation of the metal carbide mass and abrasive crystals mass is achieved within the reaction cell of a high pressure/high temperature apparatus such as described in the patents cited above. The shield metal enclosure is subjected to conditions as follows. When using abrasive crystals of polycrystalline diamond, the pressure should be at least 50 Kbars, and the temperature should be at least 1300° C. and within the diamond stable region. The reaction time should range between 3 and 120 minutes for achieving the desired degree of consolidation as well as to achieve recrystallization of the abrasive particles in the mass. With cubic boron nitride abrasive particles, the pressure should be at least 42 Kbars at a temperature of at least 1300° C. and within the cubic boron nitride stable region. The reaction time for CBN ranges from about 2–120 minutes for achieving a CBN-forming reaction. The thus-produced composite compact then can be recovered and finished in conventional fashion.

An outstanding advantage of the composite compact of the present invention is that the abrasive crystals mass of the compact can be made in increased thickness compared to conventional compacts. That is, the abrasive crystal mass of the composite compact of the present invention can range in thickness from about 1 mm to 4 mm or greater due to the size selective layers of abrasive particles used in making the compact. The composite compact then is suitably useful in cutting tools. In forming dies (U.S. Pat. No. 3,831,428), an increased thickness of the annular coarser grain layer and circular finer grain core can be important since polycrystalline wire drawing dies currently available in the marketplace can be as large as 12 mm in diameter of diamond with a 7.6 mm bore.

The following example shows how the present invention can be practiced but should not be construed as limiting. In this application all units are in the metric system unless otherwise expressly indicated. Also, all references cited are expressly incorporated herein by reference.

EXAMPLE

Following the general procedures of U.S. Pat. Nos. 3,831,428 and 3,745,623, discs and cylindrical bodies of cobalt cemented tungsten carbide were assembled with graded diamond powder in the following manner. Inside a zirconium shield metal enclosure was place a 2 mm layer of finer diamond powder having an average grain size of about 6 microns. On top of this layer was carefully place a 2 mm layer of coarser diamond power having an average grain size of about 75 microns. On top of this coarser diamond layer was placed a cylindrical disc of cobalt cemented tungsten carbide.

This assembly was processed following the cell structures and teachings of the cited patents at a pressure of 60 Kbar at 1500° C. (such conditions being in the diamond stable region) for about 30 minutes. The recovered composite compact had a well sintered diamond layer supported on the cemented carbide substrate and could be finished for a cutting tool.

Comparative samples made only with 6 microns diamond powder in a layer 4 mm thick exhibited delamination and spalling of the top diamond surface due to poor sintering. Attempts to finish these compacts into cutting tools were not possible due to the poor structure. It is expected that similar results would be obtained using such a thick layer of a mixture of coarse and fine diamond because the increased packing density would prevent full sweep through resulting in inadequate sintering at the top surface of the diamond mass.

We claim:

1. In a process for preparing a compact which comprises:
    A. placing within a protective shield metal enclosure which is disposed within the reaction cell of a high pressure/high temperature apparatus:
        (1) a mass of abrasive crystals selected from the group consisting of diamond and cubic boron nitride; and
        (2) a mass of catalyst metal selected from the group consisting of cobalt, nickel, iron, mixtures and/or alloys thereof, and aluminum alloy catalysts useful only with cubic boron nitride;
    B. subjecting the contents of the shield metal enclosure to the following conditions:
        (1) for diamond
            (a) a pressure of at least 50 Kbars at a temperature of at least 1300° C. and within the diamond stable region; and
            (b) a reaction time of 3–120 minutes;
        (2) for cubic boron nitride
            (a) a pressure of at least 42 Kbars at a temperature of at least 1300° C. and within the cubic boron nitride stable region; and
            (b) a reaction time of about 2–120 minutes; and
    C. recovering the composite compact produced;
the improvement which comprises disposing the mass of abrasive crystals in Step A. in layers, the coarsest layer being closest to the catalyst metal and being comprised of crystals having a largest dimension of between about 75 and about 500 micrometers, and the finest layer being disposed farthest away from the catalyst metal and being comprised of crystals having a largest dimension of less than 10 micrometers.

2. The process of claim 1 wherein for a composite compact, a mass of metal carbide selected from the group consisting of tungsten carbide, titanium carbide, tantalum carbide and mixtures thereof which contains said catalyst metal also is placed within said enclosure.

3. The process of claim 1 or 2 wherein said abrasive crystals are diamond and said catalyst metal is cobalt.

4. The process of claim 2 wherein said metal carbide is tungsten carbide.

5. The process of claim 1 or 2 wherein said layers of abrasive crystals are between about 1 and 4 mm in total thickness.

6. The process of claim 1 or 2 wherein said mass of abrasive crystals contains at least 70% by volume of said abrasive crystals.

7. The process of claim 1 wherein said crystals comprise cubic boron nitride and said conditions comprise a temperature of at least about 1600° C.

8. The process of claim 1 or 7 wherein said crystals comprise cubic boron nitride and an aluminum-containing catalyst is in admixture with said cubic boron nitride crystals.

9. The process of claim 8 wherein said aluminum-containing catalyst is a pre-formed alloy or an alloy formed in situ in said process from an alloying metal selected from the group consisting of nickel, cobalt, iron, vanadium and chromium.

10. The process of claim 9 wherein said alloying metal is nickel.

11. The process of claim 9 where for a composite compact, a mass of metal carbide selected from the group consisting of tungsten carbide, titanium carbide, tantalum carbide and mixtures thereof which contains said catalyst metal also is placed within said enclosure.

12. The process of claim 2 for making a wire die blank wherein said coarsest layer is arranged concentrically adjacent to an annular carbide mass and said finest layer comprises a circular core.

13. The process of claim 12 wherein said abrasive crystals comprise diamond and said catalyst metal comprises cobalt.

14. The process of claim 13 wherein said metal carbide comprises tungsten carbide.

15. An improved compact of a polycrystalline mass comprising: (a) abrasive crystal grains selected from diamond and cubic boron nitride, and (b) a catalyst metal selected from cobalt, iron, nickel, mixtures and/or alloys thereof and aluminum alloy catalysts useful only with CBN, said abrasive crystal grains, in random orientation, being directly bonded to adjacent crystal grains in said mass thereof; wherein the improvement comprises said polycrystalline mass of abrasive crystal grains having at least two layers, a layer of coarser grains being derived from crystals having a largest dimension of between about 75 and 500 microns and a finer layer of crystal grains derived from crystals having a largest dimension of less than 10 microns, said layers of said crystal grains being bonded to each other.

16. The compact of claim 15 which is a composite compact of said polycrystalline mass of crystal grains supported on a sintered metal carbide mass, said layer of coarser grains being adjacent to and bonded to said carbide mass.

17. The compact of claim 15 or 16 wherein said abrasive crystal grains are diamond.

18. The compact of claim 15 or 16 wherein said abrasive grains are cubic boron nitride.

19. The compact of claims 15 or 16 wherein said catalyst metal is cobalt.

20. The composite compact of claim 16 wherein said carbide mass is comprised of tungsten carbide.

21. The compact of claim 15 or 16 wherein the total thickness of said layers of abrasive crystal grains is between about 1 and 4 mm.

22. A wire die blank made from the composite compact of claim 16 wherein said carbide mass is annular, said coarsest layer is arranged concentrically adjacent to said carbide mass, and said finest layer comprises a circular core.

23. The wire die blank of claim 22 wherein said abrasive crystals comprise diamond and said catalyst metal comprises cobalt.

24. The wire die blank of claim 23 wherein said metal carbide comprises tungsten carbide.

* * * * *